UNITED STATES PATENT OFFICE 2,352,514

OXIMINO ETHER

Herman A. Bruson and Thomas W. Riener, Philadelphia, Pa., assignors to The Resinous Products & Chemical Company, Philadelphia, Pa., a corporation of Delaware No Drawing. Application February 28, 1941, Serial No. 381,075

11 Claims. (Cl. 260—464)

This invention relates to reaction products of oximes and reactive $\alpha,\beta$-unsaturated polar compounds in which a double bond between two hydrogen-bearing carbon atoms is activated by an adjacent non-ionogenic heterogeneous negative group.

We have found that an oxime reacts in the presence of an alkaline condensing agent with said unsaturated compound, the oxime adding to the carbon atoms across the olefinic double bond of the unsaturated compound to form an oximino ether. The reaction may be illustrated by the following equation:

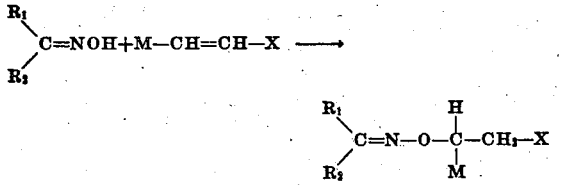

wherein $R_1$ represents hydrogen, a hydrocarbon radical, or a neutral substituted hydrocarbon radical, $R_2$ represents hydrogen, a hydrocarbon radical, or a neutral substituted hydrocarbon radical, M represents hydrogen or an organic radical, and X represents a non-ionogenic heterogeneous negative organic group.

The reaction is general for oximes, whether ketoximes or aldoximes. The oximes may be saturated or unsaturated, have short chains or long chains, and contain open chains or rings. Any specific oxime may be selected from the aliphatic, cycloaliphatic, arylaliphatic, aromatic, or heterocyclic series. The oxime may be one which is mixed in character, having groups from several such series. It may contain not only hydrocarbon groups, but hydrocarbon groups having one or more hydrogen atoms replaced with such substituents as hydroxyl, alkoxy, aryloxy, halogen, nitro, cyano, keto, thio, sulfone, or other neutral group which does not destroy the alkaline catalyst or condensing agent used. The oxime may contain one oximino group or more than one such group. In the latter case, more than one of the said $\alpha,\beta$-unsaturated polar compounds may be reacted therewith or more than one mol of a given unsaturated compound may be combined therewith.

Typical oximes which may be employed for the purpose of this invention are, by way of example, the following:

Acetaldoxime, propionaldoxime, butyraldoxime, heptaldoxime, octylaldoxime, dodecanaldoxime, hexadecanaldoxime, octadecanaldoxime, benzaldoxime, glucose oxime, cinnamaldoxime, crotonaldoxime, furfuraldoxime, naphthaldoxime, vanillinoxime, p-chlorobenzaldoxime, p-nitrobenzaldoxime, acetone oxime, cyclohexanone oxime, acetophenone oxime, undecanone oxime, methyl hexyl ketoxime, methyl amyl ketoxime, di-isobutylketoxime, camphoroxime, benzoquinone di-oxime, benzoin oxime, anisoin oxime, anthraquinone oxime, dimethyl glyoxime, and homologues thereof.

Among the more readily available $\alpha,\beta$-unsaturated polar compounds which possess the required non-ionogenic heterogeneous negative group and which are useful in this reaction may be mentioned acrylonitrile, crotonitrile, maleic dinitrile, acrylamide, crotonamide, maleic-N-methyl-imide, and the esters of acrylic, $\beta$-benzoylacrylic, crotonic,  cinnamic, maleic, and fumaric acids. Other $\alpha,\beta$-unsaturated polar compounds such as nitro-ethylene, vinyl-p-tolyl sulfone, and the like may be used. In connection with these compounds it should be noted that there are other compounds which rearrange to give $\alpha,\beta$-unsaturated compounds having the required structure, as, for example, allyl cyanide, which on being heated in the presence of an alkaline catalyst yields crotonitrile.

The examples of the $\alpha,\beta$-unsaturated polar compounds fall within the general formula $$M-CH=CH-X$$

M may be hydrogen or any organic group, such as an aliphatic, aryl, arylaliphatic, alicyclic, or heterocyclic group including heterocycles formed within the compound as in the case of the maleimides. The olefinic double bond of the $\alpha,\beta$-unsaturated polar compound is activated by the non-ionogenic heterogeneous negative group, X, which is in juxtaposition thereto.

The non-ionogenic heterogeneous negative group is one composed of different kinds of multivalent atoms which are bound together by multiple bonds. This group is an organic group which is neutral in an ionic sense. While the term "negative group" is well understood in organic chemistry and is recognized as defining a group which activates hydrogen in an adjacent methylene group, the general class is here further limited by the requirements as to heterogeneity and freedom from ion formation. The radicals falling within the expression "non-ionogenic heterogeneous negative group" have been found to activate the —CH=CH— group and to give the desired reaction with oximes. Typical effective groups for X are:

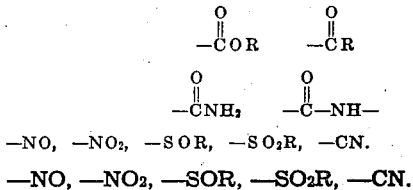

—NO, —NO₂, —SOR, —SO₂R, —CN.
—NO, —NO₂, —SOR, —SO₂R, —CN.

As condensation catalysts having an alkaline reaction there may be mentioned, for example, the oxides, hydroxides, amides, hydrides, or alcoholates of the alkali or of the alkaline earth metals, the alkali metals themselves, and the strongly basic non-metallic hydroxides such as quaternary ammonium hydroxides. The amount of alkaline condensation catalyst used is small and may vary from about 0.5 to 5% on the weight of the oxime employed.

The reaction may be carried out in water or in inert organic solvents such as, for example, dioxane, benzene, or ether. It may in general be performed between about 0° C. and steam bath temperatures. While it begins at ordinary temperature, it may be rapidly accelerated at temperatures between about 40° and 70° C., which is a good operating range. When the reaction has been essentially completed, it has been found advantageous to remove or neutralize the alkaline catalyst before isolating the reaction product by distillation under reduced pressure, or otherwise, in order to prevent decomposition. The products obtained are new substances which are useful for the preparation of dyes, drugs, insecticides, or textile assistants.

The following examples illustrate this invention, it being understood that other oximes can be used mol for mol in place of those specifically described.

Example 1

A mixture of 25 g. of methyl ethyl ketoxime and 0.4 g. of sodium methylate (powder) was warmed to 50–60° C. and stirred until the sodium methylate had dissolved and a clear solution was obtained. The solution was cooled to 20° C. and 15 g. of acrylonitrile added dropwise while the solution was stirred. The mixture gradually became warm (40° C.). It was stirred for 18 hours at room temperature, then neutralized with dilute hydrochloric acid. The oil layer formed and was separated, filtered, and distilled under reduced pressure. A colorless oil distilled over at 109° C./21 mm. in a yield of 28 g. Its analysis agrees with the formula

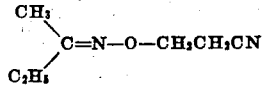

It has a pleasant odor, a value for $N_D^{25}$ of 1.4418 and a specific gravity at 25° C. of 0.9484.

Example 2

A mixture of 28.2 g. of α-ethyl-β-propyl acrolein oxime and 0.4 g. of sodium methylate was warmed to 60° C. and stirred until a clear solution was formed. The mixture was then cooled to 25° C. and 10.6 g. of acrylonitrile added dropwise thereto while the mixture was stirred. This mixture was allowed to stand 18 hours at 25° C. It was then warmed to 90° C. on a steam bath for 45 minutes, cooled, and neutralized with dilute hydrochloric acid. An oil layer formed, which was taken up in ethylene dichloride, washed with 50 cc. of water and fractionated under reduced pressure. After the solvent and a small forerun had been distilled, the desired product came over between 105° and 115° C./1 mm. as a pale yellow oil in a yield amounting to 31 g. Its formula is

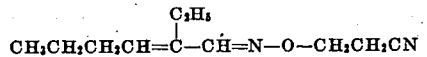

Example 3

Cyclohexanone oxime (25 g.) was mixed with 50 cc. of dioxane and 0.4 g. powdered sodium methylate. The mixture was warmed to 50–60° C. for several minutes until a clear solution formed. This was cooled to 25° C. and stirred while 11.6 g. of acrylonitrile was added dropwise. During the addition (15 minutes) the temperature rose to 46° C. The clear solution was allowed to stand 24 hours at 25° C. and was made slightly acid to brom thymol blue indicator by means of dilute hydrochloric acid. The solution was then filtered and the filtrate distilled under reduced pressure (21 mm.) until the vapor temperature reached 140° C. The residue was then distilled at 1 mm. The product came over as a pale yellow oil which, upon redistillation, boiled at 130–135° C./8 mm. Its analysis corresponds to the formula

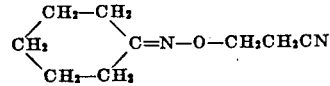

Example 4

A mixture of 24 g. of acetone oxime, 40 cc. of dioxane, and 0.4 g. of sodium methylate was stirred at 25–30° C. until a clear solution was obtained (one hour). There was then added dropwise while the solution was stirred at 22–35° C. 17.5 g. of acrylonitrile. The mixture was then stirred for several hours, during which time the temperature rose to about 50° C. After standing 12 hours at room temperature, the product was neutralized with dilute hydrochloric acid and the solution distilled under reduced pressure. The desired product (25 g.) came over at 85° C./10 mm. as a colorless liquid having a specific gravity of 0.9632 at 25° C., $N_D^{25}$ of 1.4388, and corresponding in composition to the formula

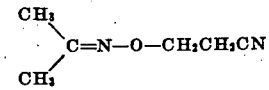

Example 5

A mixture of 28.2 g. of α-ethyl-β-propyl acrolein oximine and 0.4 g. of sodium methylate was warmed to 60° C. and stirred until a clear solution was formed. The mixture was then cooled to 15° C. and 30.6 g. of n-butyl-N-maleimide added dropwise thereto while the mixture was stirred and cooled so that the reaction temperature did not exceed 35° C. The addition required about one hour. The mixture was allowed to stand at room temperature for 18 hours and was then carefully neutralized with dilute hydrochloric acid to destroy the sodium methylate. The mixture was then extracted with benzene and the benzene extract washed with water, dried over sodium sulfate, filtered, and the filtrate distilled under reduced pressure. After the benzene had come off, the main fraction distilled between 180° and 190° C. at 2 mm. as a red oil in a yield of 30 g. Upon redistillation it boiled at 187° C./2 mm. Its formula is

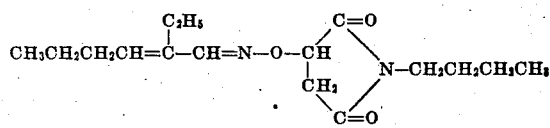

In the same manner, N-methyl, N-ethyl, N-benzyl, or N-cyclohexyl maleimide may be used mol for mol in place of the N-butyl maleimide.

*Example 6*

Diethyl maleate (34.4 g.) was added to a solution of 0.4 g. of sodium methylate in 28.2 g. of α-ethyl-β-propyl acrolein oxime. The mixture was allowed to stand two hours and was then heated at 68–70° C. for four hours. The product, after standing 18 hours, was then neutralized with dilute hydrochloric acid, washed with cold water, dried and distilled in vacuo. After unchanged starting materials had been removed below 150° C./1 mm., the main fraction boiled at 160° C./1 mm. giving a yield of 30 g. of a pale red oil, the analysis of which agrees with the formula

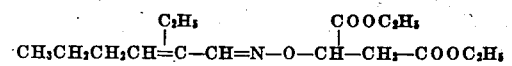

In the same manner, the methyl, propyl, butyl or other esters of maleic acid or of fumaric acid may be used mol for mol in place of the diethyl maleate.

*Example 7*

To a clear solution of 0.4 g. of sodium methylate in 28.2 g. of α-ethyl-β-propyl acrolein oxime there was added dropwise 17.2 g. of methyl acrylate while the mixture was stirred at 25–30° C. After standing one hour at 25–30° C., the solution was heated at 60–70° C. for three hours, then allowed to stand for 18 hours at room temperature. It was finally neutralized with hydrochloric acid, washed with water, dried over sodium sulfate and distilled in vacuo in a yield of 26 g. The main fraction boiled at 140° C./7 mm. It is a colorless oil having the formula

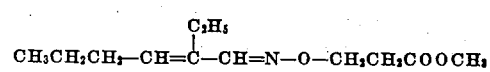

In the same manner other esters of acrylic acid may be used mol for mol in place of methyl acrylate, for example, ethyl acrylate, butyl acrylate, cetyl acrylate, etc.

*Example 8*

Sodium methylate (0.4 g.) was dissolved in 28.2 g. of α-ethyl-β-propyl acrolein oxime by warming to 50° C. for several minutes. The solution was cooled to 20° C. and 28.4 g. of n-butyl crotonate added during five minutes while the solution was stirred. This solution was then stirred one hour at 20–25° C., heated at 70° C. for six hours, cooled and neutralized with dilute hydrochloric acid, brom-thymol blue being used as indicator. The oil obtained was washed with water, dried over sodium sulfate and distilled under reduced pressure. The desired product boiled between 143° and 147° C. at 2 mm. It is a colorless oil, the analysis of which agrees with the formula

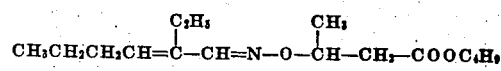

In the same manner, the methyl, ethyl, propyl or other esters of crotonic acid may be used mol for mol in place of butyl crotonate.

*Example 9*

A mixture of 18 g. of furfuraldoxime (syn-form M. P. 88° C.), 25 cc. of dioxane, and 0.3 g. of sodium methylate was heated and stirred at 50–60° C. until a clear solution was obtained. This was cooled to 20° C. and 8.5 g. of acrylonitrile added dropwise during one-half hour while the mixture was stirred. The temperature tended to rise but was controlled by cooling so that it remained between 30° and 40° C. The mixture solidified to a crystalline mush. Dioxane (50 cc.) was added to assist stirring, and the mixture stirred for an additional two hours at room temperature. The alkalinity was then neutralized with dilute hydrochloric acid and the crystals filtered off. The yield was 12 g. After recrystallization from benzene, the pure compound formed water-soluble, long, colorless needles melting at 116° C., having the formula

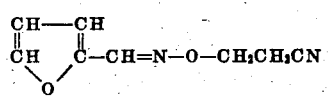

*Example 10*

To a solution of 25 g. of acetophenone oxime, 100 cc. of benzene and 2 g. of a 40% aqueous solution of trimethylbenzyl ammonium hydroxide 9.8 g. of acrylonitrile was added dropwise while the solution was stirred rapidly and then this mixture was stirred for two hours at room temperature. It was then stirred and heated at 40–50° C. for two hours longer. It was filtered, and the clear filtrate evaporated to dryness under reduced pressure on a steam bath. The residual oil crystallized on cooling, giving a yield of 32 g. Upon recrystallization from methanol, colorless needles, melting at 44° C., were obtained having the formula

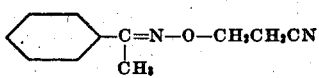

*Example 11*

To the rapidly stirred mixture of 34.8 g. (0.3 mol) of dimethyl glyoxime, 150 g. of water, and 4 g. of 50% solution of sodium hydroxide there was added dropwise during 50 minutes 31.8 g. (0.6 mol) of acrylonitrile. The temperature during this period gradually rose from 25° C. to 38° C. as the reaction proceeded. It was then cooled to 25° C. and stirred for 24 hours at this temperature, giving a thick crystalline magma which was diluted with 250 cc. of water, filtered by suction, and washed with water and dried. The air-dried crystals were then extracted with ethylene dichloride, filtered from traces of insoluble dimethyl glyoxime, and the extract concentrated and allowed to crystallize. The crystals were purified by recrystallization from ethylene dichloride. They separated as colorless plates in a yield of 40 g., melting at 123° C., and corresponding to the formula

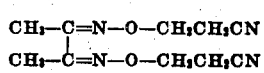

*Example 12*

To a solution of 1 gram of sodium methylate in 71.5 g. of methyl-n-hexyl-ketoxime there was added dropwise 26.5 g. of acrylonitrile while the solution was stirred and cooled to 30–40° C. The mixture was allowed to stand for 20 hours at room temperature (25–30° C.) and was then faintly acidified with dilute hydrochloric acid and washed with water. The washed oil was distilled under reduced pressure. The product boiling at 102–104° C./1 mm. was a colorless oil weighing 81 g., having the formula

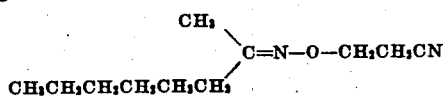

and the following properties: $N_D^{25}$, 1.4482 and specific gravity at 25° C., 0.9091.

Example 13

To a solution of 5 g. of an aqueous 40% solution of trimethylbenzyl ammonium hydroxide in 71.5 g. of α-ethyl hexylaldozime there was added dropwise 26.5 g. of acrylonitrile while the solution was stirred. The mixture warmed gradually but spontaneously to 57° C. It was stirred thereafter for four hours at room temperature, then mixed with water, neutralized with dilute hydrochloric acid, washed thoroughly with water and distilled under reduced pressure. The product, boiling at 90° C./0.5 mm., was a colorless oil having the formula

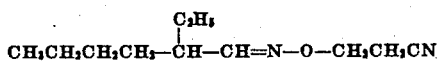

We claim:

1. A method for preparing an oximino ether which comprises reacting an oxime in the presence of an alkaline condensing agent with an organic compound in which a double bond between two hydrogen-bearing carbon atoms is activated by an adjacent nitrile group.

2. A method for preparing an oximino ether which comprises reacting a ketoxime in the presence of an alkaline condensing agent with an organic compound in which a double bond between two hydrogen-bearing carbon atoms is activated by an adjacent nitrile group.

3. A method for preparing an oximino ether which comprises reacting an aldoxime in the presence of an alkaline condensing agent with an organic compound in which a double bond between two hydrogen-bearing carbon atoms is activated by an adjacent nitrile group.

4. A method for preparing oximino ethers which comprises reacting an oxime in the presence of an alkaline condensing agent with a nitrile of a carboxylic acid having an olefinic double bond between two hydrogen-bearing carbon atoms in the α,β-position.

5. A method for preparing an oximino ether which comprises reacting an oxime in the presence of an alkaline condensing agent with acrylonitrile.

6. An oximo ether of the formula

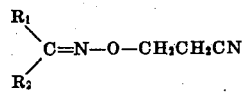

wherein $R_1$ and $R_2$ are selected from at least one member of the group consisting of hydrogen, hydrocarbon radicals, and neutral substituted hydrocarbon radicals.

7. A 2-cyanoethyl ketoximino ether.

8. A 2-cyanoethyl aldoximino ether.

9. The compound having the formula

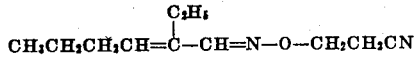

10. The compound having the formula

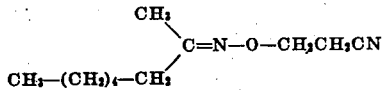

11. The compound having the formula

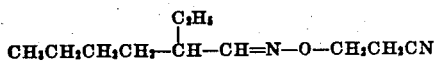

HERMAN A. BRUSON.
THOMAS W. RIENER.